Nov. 2, 1954  R. DAON  2,693,511
AUTOMOBILE DIRECTIONAL SIGNAL
Filed Oct. 8, 1951  2 Sheets-Sheet 1

INVENTOR.
RENE DAON
BY
ATTORNEY

Nov. 2, 1954  R. DAON  2,693,511
AUTOMOBILE DIRECTIONAL SIGNAL
Filed Oct. 8, 1951  2 Sheets-Sheet 2
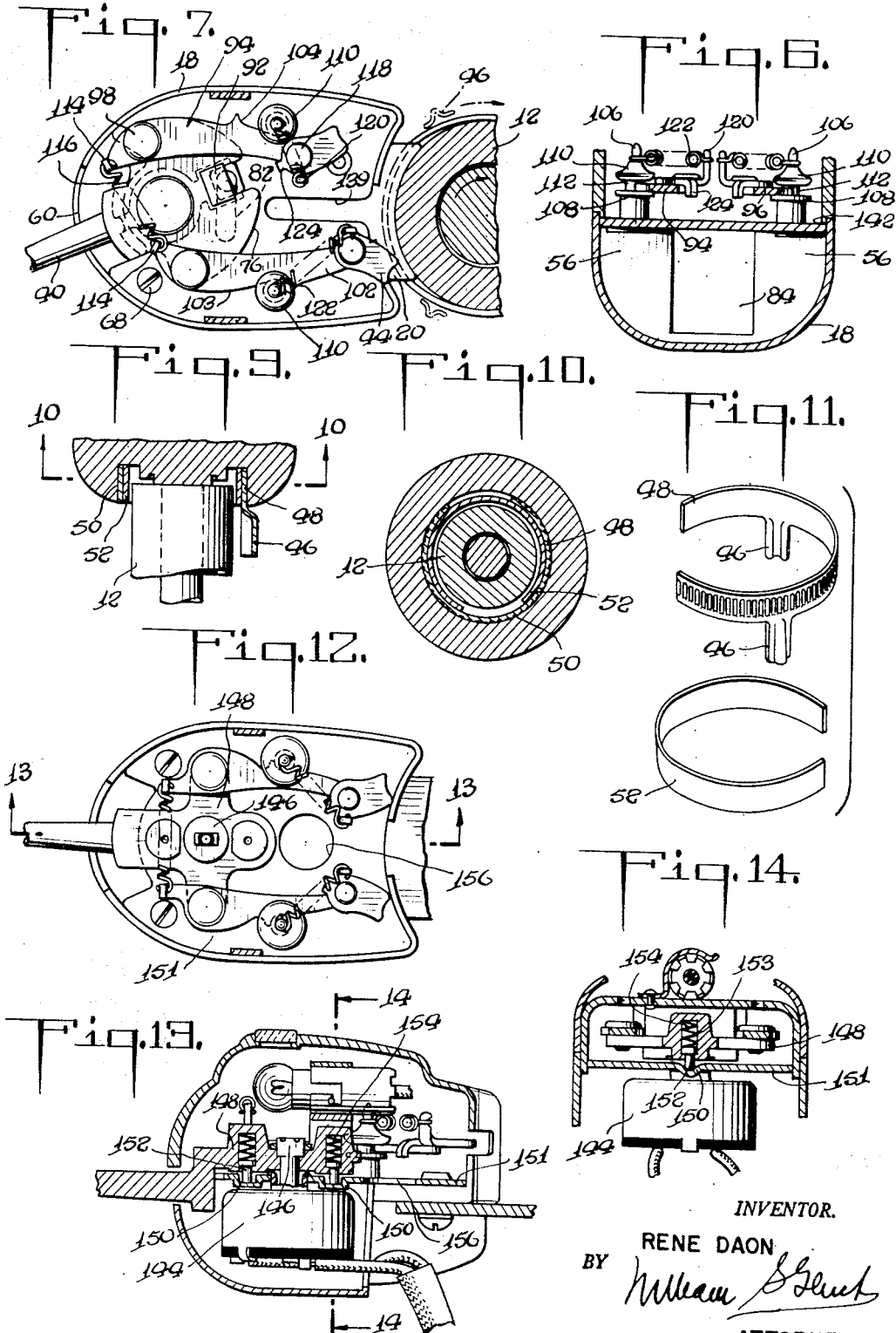
INVENTOR.
RENE DAON
BY
ATTORNEY United States Patent Office 2,693,511
Patented Nov. 2, 1954

2,693,511

AUTOMOBILE DIRECTIONAL SIGNAL

Rene Daon, Norwalk, Conn., assignor to Yankee Metal Products Corp., Norwalk, Conn., a corporation of New York Application October 8, 1951, Serial No. 250,230

22 Claims. (Cl. 200—61.34)

This invention relates generally to directional signalling devices for automobiles and more particularly to the devices of the self-cancelling type.

The invention will be described by reference to an arrangement wherein the signal switch is attached to the steering column of a car, and wherein signal cancelling is effected by means located on the steering wheel and in the switch.

One of the objects of the present invention is to provide a signal cancelling means which can be detachably attached to a steering gear quickly and without requiring any special skill or the use of tools.

More particularly it is an object of the invention to provide self-cancelling means which is readily adjustable to establish the necessary cooperation of the same with the signal switch.

Another object of the present invention is to provide a new and improved switch mechanism for an automobile directional signal.

The general object of the invention is to provide a signal cancelling means of the character described which is simple to operate, inexpensive to make, and the installation and adjustment of which can be effected quickly, simply and without requiring skill or tools.

Other objects of the invention will in part be obvious and in part hereinafter pointed out.

The invention accordingly consists in the features of construction, combinations of elements and arrangements of parts hereinafter described and of which the scope of application will be indicated in the appended claims.

Fig. 6 is a sectional view taken substantially along the line 6—6 of Fig. 4;

Fig. 7 is a view similar to Fig. 3 but showing the switch thrown to an operative position whereby a left turn is indicated;

Fig. 9 is a fragmentary sectional view taken substantially along the line 9—9 of Fig. 1;

Fig. 10 is a sectional view taken substantially along the line 10—10 of Fig. 9;

Fig. 11 is a perspective view of the part of the cancelling means disposed on the steering wheel, said part being shown disassembled;

Fig. 12 is a top fragmentary view of a switch embodying a modified form of the present invention, the top of the housing having been removed to show the elements;

Fig. 13 is a sectional view taken substantially along the line 13—13 of Fig. 12; and Fig. 14 is a sectional view taken substantially along the line 14—14 of Fig. 13.

Figure 1:
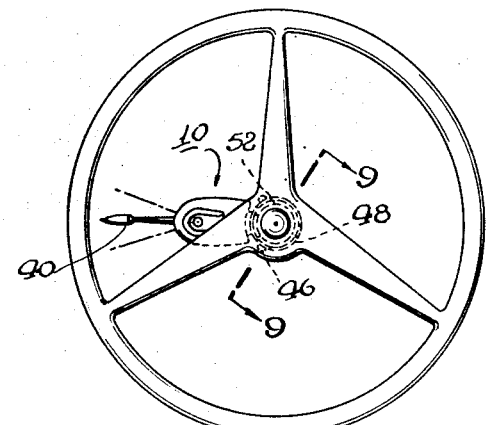
Fig. 1 is a top view of an automobile steering gear having a self-cancelling directional signal switch embodying the present invention disposed thereon.
Figure 5:
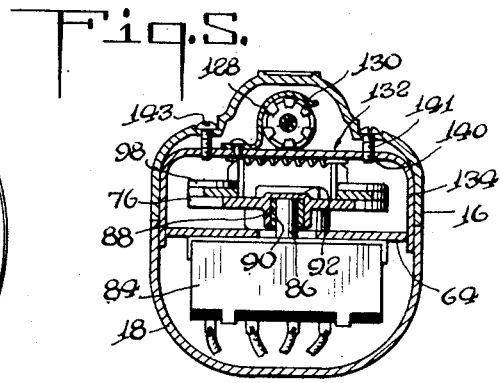
Fig. 5 is a sectional view taken substantially along the line 5—5 of Fig. 4.
Figures 2, 4:
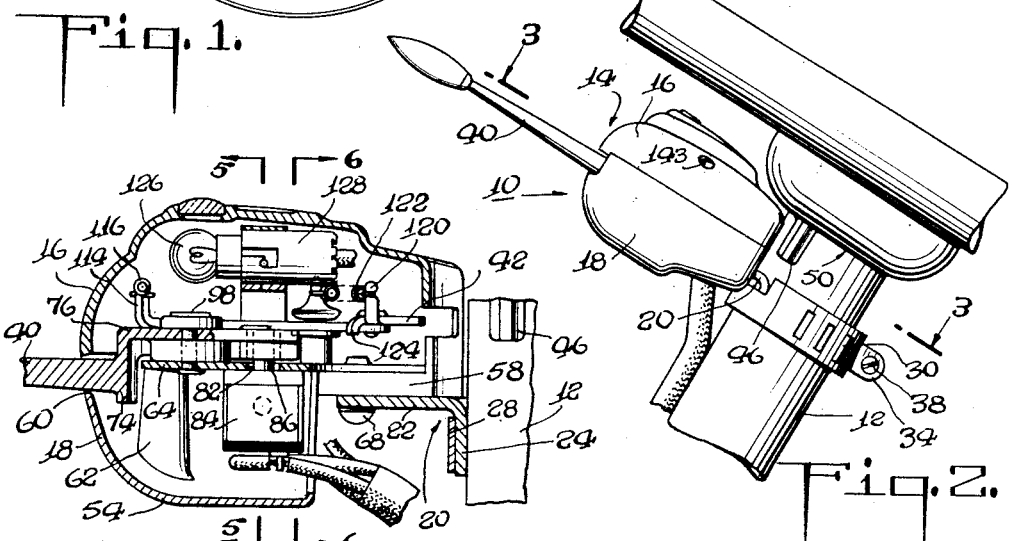
Fig. 2 is a side fragmentary view of the steering gear and directional signal switch shown in Fig. 1.
Fig. 4 is a sectional view taken substantially along the line 4—4 of Fig. 3.

Referring now in detail to the drawings the reference numeral 10 denotes an automobile directional signal switch attached to the steering column 12 of an automobile. The switch includes a casing 14 having an upper housing 16 and a lower housing 18. At the end of the lower housing facing the steering column, a steering post bracket 20 is secured. Said bracket includes a portion 22 extending away from the switch, said last-named portion being integral at its end facing the steering column with a downwardly extending reach 24. The reach and thus the lower housing in which the mechanism of the switch is disposed is secured to the steering column by a flexible band 28 having slots 30 at its ends. The band is tightened by any conventional means, e. g. elements 32 each having a narrow portion 34 and a wider portion 36, the wider portion being larger than said slots. The narrow portion of one element is inserted into a slot of one end of the band so as to protrude from the steering column. An element is similarly disposed in the other end of the band. The narrow ends have registered openings and a nut and bolt 38 effects the closure and tightening of the narrow ends and thereby the band.

Figures 3, 8:
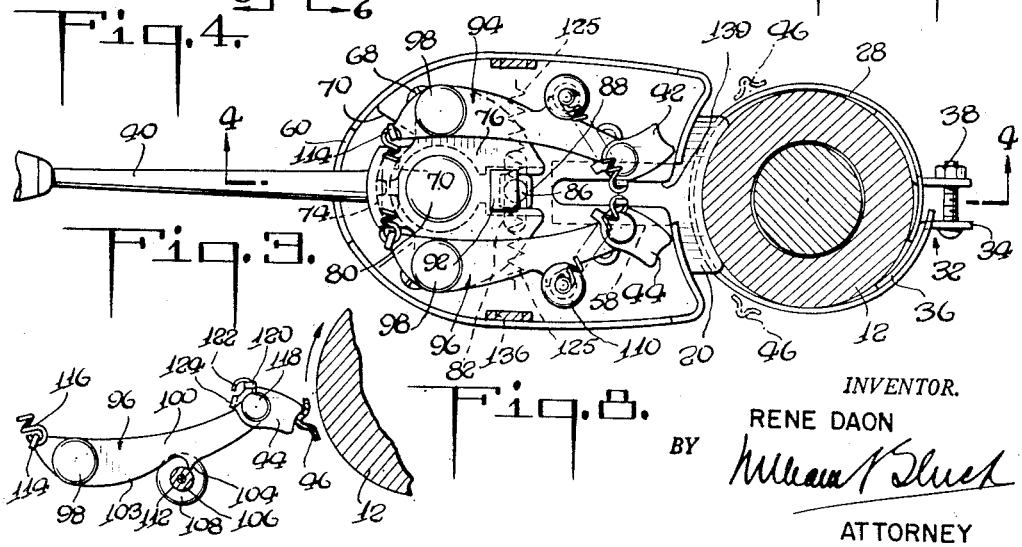
Fig. 3 is a sectional view taken substantially along the line 3—3 of Fig. 2.
Fig. 8 is a detail of elements of both parts of the cancelling means immediately prior to cancelling.

When an actuating arm 40 of the switch is pushed upwardly from its position of Fig. 3, a trigger 42 will extend from the switch casing at the end facing the steering column. Similarly, when the arm is pulled downwardly, a different trigger 44 will extend (see Fig. 7). When the actuating arm is at central, i. e. inoperative position, neither trigger protrudes. The arm is pushed upwardly when a right turn is to be made and pulled downwardly when a left turn is to be made.

Cancelling means is provided to return the switch to inoperative position when the steering wheel turns in a direction opposite from that of the turn signalled and made. The part of said last-named means located on the steering wheel includes two depending actuating abutments 46 spaced from each other. The abutments are located on the undersurface of the steering wheel and their surfaces remote from the steering column face the switch. The abutments are about 120° apart with respect to the longitudinal axis of the column, one above the switch and one below when the steering wheel is in inoperative position. When the wheel is rotated in making a turn before or during which time the switch is thrown to indicate that turn, the abutments will strike a protruding trigger which will be deflected and spring out again after the abutments have passed. When the wheel rotates the other way after the turn, an abutment will engage the trigger to actuate a mechanism which returns the switch to inoperative position. If the switch is thrown the wrong way for the turn being made, i. e. pulled down for a right turn, it will shut off when the wheel is being rotated.

Pursuant to the present invention, the actuating abutments are carried by a split ring 48 fabricated, e. g., from resilient sheet metal. Said ring when unstressed has a diameter greater than that of an annular recess 50 in the bottom of the steering wheel. Since it must be compressed in order to fit in the recess, it will be fixed in place by the friction caused by its own resiliency. The outer surface of the ring may be roughened as by knurling to make sure that the ring stays in place. Since the diameter of the ring is greater before it is inserted, the abutments will be spaced farther apart on the open ring than they should be when the ring is inserted and its diameter reduced. Also, the abutments may be spaced different distances from each other depending upon the structure of the part of the cancelling means with which the ring and abutments are to be used.

Thus, the part of the cancelling means located in the steering column may be put in place simply and easily by a layman and adjusted to bring the abutments into proper position relative to the switch.

As a further provision for insuring the maintenance of the ring in its adjusted position, a second split ring 52 may be used with a first ring either having or not having a knurled outer surface. The second ring is of about the same size when unstressed as the first ring but is fitted in place within the ring after the first ring is inserted and adjusted. The unstressed diameter of the second ring is somewhat greater than the diameter of the first ring when in place whereby the former exerts expanding pressure on the first ring. Thus, although the first ring may be so constructed as to retain its adjusted position after insertion, the second ring may be employed as a locking means to make certain that the first ring will not move from its proper position.

In further pursuance of the instant invention a novel and improved part of the cancelling means is provided in the switch.

The end of the casing remote from the steering column and through which the actuating arm projects will be referred to as the front, and the other end will be referred to as the rear.

The base 54 of the bottom housing is recessed upwardly near the rear whereby two platforms 56 are provided slightly below the top of the bottom housing. Said base has a wide slot 58 running from the rear to the front of the recessed portion. At the front end of the bottom housing a lateral slot 60 is disposed, said slot being located in the top edge of the bottom housing. On each side of the bottom housing, a support 62 is formed integral with the inner wall near the front of the housing. Said supports are level with the platforms 56 and have threaded holes therein. Each platform has a hole therein.

A switch mounting plate 64 is seated on the supports and platforms and has openings registered with the holes in the supports and platforms, the openings registered with the holes in the platform being threaded. The plate is held to the platforms and to the supports by headed screws 68.

The mounting plate is provided with a recess 70 at its front. The actuating arm 40 is integral at its rear end with and perpendicular to a downwardly extending flange 74 of a pivot plate 76, the rear of said plate being secured to the top of the flange. The flange is located in the recess 70.

The pivot plate 76 is secured rotatably near its front to a pivot pin 80 carried by the switch plate. A lateral slot 82 is located near the front of the mounting plate, and a conventional six wire electric switch 84 is disposed below said slot on the undersurface of the switch plate.

The electric switch is actuated from the pivot plate by a structure as follows: an actuating pin 86 extending from the electric switch is rotatably received in a cube-shaped bushing 88. The bushing fits slidably in a radial channel 90 disposed at the front of the pivot plate. The sides of said channel are parallel to each other and transverse to the slot 82, and the channel passes over slot 82. When the pivot plate is rotated, the circular motion thereof is converted into linear motion of the actuating pin because the bushing slides in the channel towards the front or rear of the pivot plate. A cube-shaped bushing is used because uniform wearing is obtained with it. A cover piece 92 extends over the rear of the channel a sufficient distance to prevent the bushing from falling out even when it shifts to the rear of the pivot plate.

The part of the cancelling means contained in the switch includes two trigger arms 94, 96 rotatably mounted on step pivots 98 located on each side of the pivot plate near the front thereof. Said trigger arms have elongated portions 100, 102 extending beyond the pivot plate rearwardly and almost to the rear of the mounting plate. The outer edge 103 of each elongated portion has a detent 104 formed thereon. The rear of each detent is formed by an outward and slightly concave front sloping of the edge 103. The front of each detent is sloped in the same fashion as the rear but preferably at a steeper angle. The front, however, should not be so shaped as to form a hook.

Posts 106 are located adjacent the front of each detent. A wide washer 108 is disposed on each post below the trigger arm, and a spacer 110 is disposed on each post above the trigger arm. Between each spacer and washer a bushing 112 is placed on each post, each said bushing abutting the rear of its associated detent when the switch is in inoperative position, at which time the trigger arms are symmetrically disposed as shown in Fig. 3. At the front of each trigger arm an upstanding hook 114 is provided. A coil spring 116 connects the hooks and biases the front ends of the trigger arms towards each other.

At the rear ends of the trigger arms triggers 42, 44 are rotatably attached at their front ends by step rivets 118. The triggers are elongated strips of metal having their rear ends concave. Each trigger has an upstanding hook 120 formed forward of the step rivet. A coil spring 122 is held between the hook of a trigger and the top of the post adjacent the detent carried by the trigger arm to which the particular trigger is secured. The springs 122 rotatably bias the rear ends of the trigger towards each other. Means is provided to stop such rotation with the trigger in predetermined position with respect to the trigger arms. Said means constitutes a tab 124 carried by each trigger and extending downwardly below the trigger arms at the front end of each trigger and normally abutting the inner edge of each trigger arm.

Means is provided in the electric switch 84 to bias the actuating pin 86 and thus the pivot plate to inoperative position, said means constituting a pair of springs 125 located adjacent the pin in the electric switch and extending to opposite sides of the pin.

The cancelling means operates as follows: when the actuating arm 40 of the switch is moved to an operative position as shown in Fig. 7, the pivot plate turns and moves one trigger arm forwardly and the other rearwardly. Of course, at this time the electric switch is actuated to give the proper light signal. The trigger arm moving forwardly slides against the bushing in its post, being pulled thereagainst by the spring connecting the post to the trigger hook 120 and also by spring 116. The detent on the other trigger arm, i. e. the trigger arm moving rearwardly, moves past its post, and the bushing of the latter then slides behind the detent and into the front edge thereof. The biasing force of the spring 125 is opposed by a force biasing the rear end of each trigger arm outwardly. Such biasing force constitutes the springs 116 and 122 although either one of these would suffice.

The outwardly biasing forces create friction between the front of the detent and the bushing, and this also opposes the restoring forces. The front edge of the detent is sloped at an angle slightly exceeding 90° to a line drawn from the center of the step pivot 98 to the front edge of the detent. Accordingly, the restoring force acts through a steep edge (constituting a cam) and normally cannot overcome the opposing force of springs 116 and 122. This latter force can, however, be overcome by manual pressure on the actuating arm.

In the ordinary operation of a car, after the actuator arm has been locked in one of its operative positions, the steering wheel will be turned in the direction in which the actuating arm has been moved. The depending abutments will strike the inner edge of a protruding (rearwardly moved) trigger, and the trigger will be deflected and out of protrusion. In this way, the abutment will pass the trigger which will snap back into protruding position. But when the wheel is returning to straight position after the turn, the first depending abutment to contact the trigger will engage the concave rear end thereof which it cannot pass since rotation of the trigger in the direction opposite to that of deflection is stopped by the tab. Thus, the trigger arm itself will be pushed away from its post until the front of the detent is clear of the bushing in the post whereupon the restoring force of springs 125 will return the switch to inoperative position. The rear end of the trigger is made concave to obtain smoothness of operation and to reduce the possibility of jamming when the switch is operated improperly. The abutment has a V-shaped outwardly extending transverse cross-sectional contour (see Fig. 8). The edge of said abutment which engages the concave end of a protruding trigger is disposed to lie substantially perpendicular to the direction in which the trigger is pushed by said abutment during cancelling, the portion of said end thus engaged being shaped to lie substantially flat against that abutment.

Once the detent is clear of the post, the force of springs 116 and 122 no longer opposes the restoring force. At the same time as the switch returns, the actuating pin returns to inoperative position and the light signal is cancelled.

The actuating arm is limited in its movement to either operative position by abutment of the downwardly extending reach 24 against a side of slot 60.

The switch is provided with a pilot light 126 connected to the circuit of the signal, said pilot operating when the electric switch is operated. If any lamp in the circuit fails to operate when the switch is thrown, the pilot light will not go on. The pilot light fits a socket 128 which is held by a clamp 130 disposed on top of a resilient bridge 132 detachably attached to the mounting plate. The bridge extends over the cancelling mechanism and has parallel downwardly extending legs 134, the lower ends of which are conventionally shaped to detachably engage elongated slots 136 in the mounting plate. The wire from the electric switch to the pilot extends through a centrally disposed longitudinal slot 139 extending from the rear of the mounting plate almost to the center thereof. The wires from the electric switch pass through the slot 58 in the rear of the bottom housing.

The bridge is provided with tapped holes 140 in the top thereof, said holes being registered with holes 141 in said top housing, when the top housing is in place. The top housing has locating flanges 142 at intervals along the inner edge of the bottom thereof, said flanges fitting within the top of the bottom housing and matching the contours thereof.

When assembling the switch, the switch mechanism is secured to the bottom housing as described before and the top housing aligned with the bottom housing by flanges 142 and secured to the bottom housing by means of headed bolts 143 screwed through holes 141 into tapped holes 140 of the bridge.

In the modified form of the invention shown in Figs. 12, 13 and 14 a three wire electric switch 144 is employed, said switch being operated directly from the pivot 146 of a modified pivot plate 148. The pivot plate 148 is in the shape of a cross, the actuating arm being attached to the front arm thereof and trigger arms being pivoted to the side arms thereof.

The electric switch 144 does not have means to bias the actuating pivot and thus the pivot plate to inoperative position. Means for this purpose is provided, said means comprising depressions 150 in a switch mounting plate 151, the depressions being disposed below the front and rear arms of the pivot plate 148 when the switch is at inoperative position. Under the front and rear arms of the pivot plate riders 152 are located above the depressions when the switch is in inoperative position. The riders are mounted to reciprocate in bores 153 formed in the pivot plate and their bottom tips reach the bottoms of the depressions. Springs 154 are provided to force the tips of the riders against the depressions in the mounting plate. A lubricant is put on the tips and in the depressions. When the pivot plate is moved to operative position, the abutments will press against the sides of the depression which are sloped and will tend to move towards the centers thereof which are lower than the sides. Thus the pivot plate will be biased towards inoperative position.

The switch plate 151 has a central opening 156 near the rear thereof adapted to receive the wire from the pilot light.

The trigger arms and associated elements of the modified form of the invention are similar to the corresponding elements of the first described form in structure and operation.

It thus will be seen that there are provided directional signalling devices which achieve the several objects of the invention and are well adapted to meet the conditions of practical use.

As various possible embodiments might be made of the above invention and as various changes might be made in the embodiments above set forth, it is to be understood that all matter herein described or shown in the accompanying drawings is to be interpreted as illustrative and not in a limiting sense.

Having thus described the invention, there is claimed as new and desired to be secured by Letters Patent:

1. In a self-cancelling automobile directional signal having an actuating switch adapted to be disposed on the steering gear of an automobile: cancelling means for said switch, the cancelling means comprising two parts, one of said parts being disposed in the switch and the second of said parts including an abutment and a split resilient annular ring for an automobile steering wheel, said abutment being carried by said ring, said abutment being adjustable relative to said switch upon distortion of said resilient annular ring.

2. In a self-cancelling automobile directional signal having an actuating switch adapted to be disposed on the steering gear of an automobile: cancelling means for said switch, the cancelling means comprising two parts, one of said parts being disposed in the switch and the second of said parts including an abutment and a split annular ring for insertion into a recess in the undersurface of an automobile steering wheel, said abutment being carried by said ring, said ring being of resilient material and having a longer diameter before insertion into the recess than after insertion, whereby the friction caused by the resiliency of the ring holds the ring in place.

3. In a self-cancelling automobile directional signal having an actuating switch adapted to be disposed on the steering gear of an automobile: cancelling means for said switch, the cancelling means comprising two parts, one of said parts being disposed in the switch and the second of said parts including two spaced abutments and a split annular ring for insertion into a recess in the undersurface of an automobile steering wheel, said abutments being carried by said ring, said ring being of resilient material and having a longer diameter before insertion into the recess than after insertion, and the outer suface of said ring being knurled, whereby the ring is held in place.

4. In a self-cancelling automobile directional signal having an actuating switch adapted to be disposed on the steering gear of an automobile: cancelling means for said switch, the cancelling means comprising two parts, one of said parts being disposed in the switch and the second of said parts including an abutment, a split annular ring for insertion into a recess in the undersurface of an automobile steering wheel, said abutment being carried by said ring, said ring being of resilient material and having a longer diameter before insertion into the recess than after insertion, and a second split annular ring of stiff resilient material for insertion within the first ring and having a longer diameter before insertion than the first ring has after insertion, whereby the friction caused by the resiliency of the rings holds them in place.

5. In a self-cancelling automobile directional signal having an actuating switch adapted to be disposed on the steering gear of an automobile: cancelling means for said switch, the cancelling means comprising two parts, one of said parts being disposed in the switch and the second of said parts including two spaced abutments, a split annular ring for insertion into a recess in the undersurface of an automobile steering wheel, said abutments being carried by said ring, said ring being of resilient material and having a longer diameter before insertion into the recess than after insertion, the outer surface of said ring being knurled, and a second split annular ring of stiff resilient material for insertion within the first ring and having a longer diameter before insertion than the first ring has after insertion, whereby the friction caused by the resiliency of the rings holds them in place.

6. In combination in a self-cancelling automobile directional signal, an actuating switch adapted to be disposed on the steering gear of an automobile, said switch being lockable in operative position, and cancelling means for said switch, said cancelling means comprising a part disposed in the switch, said part comprising a housing, a switch mounting plate disposed in said housing, a pivot plate rotatably carried by the mounting plate, said pivot plate being secured at one end to an actuating arm extending from the end of the switch remote from the steering gear, means defining a radial channel at the other end of the pivot plate, means defining a lateral slot in the mounting plate, said slot being disposed under the channel, a bushing disposed in the channel, an actuating pin journalled in the bushing and extending below said slot and into an electric switch, return means to bias the pivot plate to inoperative position and means to unlock said switch when in operative position whereby the return means is rendered effective, said last-named means including elements of the part of the cancelling means disposed in the switch, and a second part of the cancelling means adapted to be carried by the steering wheel of the automobile, whereby said cancelling means can be operatd manually from the actuating arm or automatically from the steering wheel.

7. A combination as set forth in claim 6 wherein the elements of the part of the cancelling means which are disposed in the switch and included in the unlocking means comprise two trigger arms each mounted pivotally at one end thereof to one side of the pivot plate, said trigger arms extending toward the end of the switch adjacent the steering column, two triggers, one trigger being pivotally mounted on the end of one trigger arm adjacent the steering column and the other trigger being similarly mounted on the other trigger arm, guide means adjacent the outer edge of each trigger arm, spring means connecting an end of each trigger to the guide means of the trigger arm on which the trigger is mounted, stop means at an end of each trigger to maintain said triggers in a predetermined position, spring means disposed at the opposite ends of the trigger arms from those at which the triggers are disposed and connecting said ends of the trigger arms, both said spring means biasing the ends of the trigger arms carrying the triggers outwardly, the outer edge of each trigger arm having disposed thereon a detent cooperable with the guide means to lock the trigger arm in position when moved towards the steering gear whereupon the trigger carried by such a trigger arm will extend from the switch, and wherein the second part of the cancelling means includes an abutment adapted to contact an extending trigger when the steering wheel is rotated in either direction, said trigger being mounted so as to be deflected when contacted by an abutment moving in one direction and so as to move the trigger arm and thus the locking detent out of locking position when the abutment contacts the trigger in the opposite direction whereby the return means is rendered effective.

8. In combination in a self-cancelling automobile directional signal, an actuating switch adapted to be disposed on the steering gear of an automobile, said switch being lockable in operative position, and cancelling means for said switch, said cancelling means comprising a part disposed in the switch, said part comprising a housing, a switch mounting plate disposed in said housing, a pivot plate rotatably carried by the mounting plate, said pivot plate being secured at one end to an actuating arm extending from the end of the switch remote from the steering gear, means defining a radial channel at the other end of the pivot plate, means defining a lateral slot in the mounting plate, said slot being disposed under the channel, a cube-shaped bushing disposed in the channel, an actuating pin journalled in the bushing and extending below said slot and into an electric switch, return means to bias the pivot plate to inoperative position and means to unlock said switch when in operative position whereby the return means is rendered effective, said last-named means including elements of the part of the cancelling means disposed in the switch, and a second part of the cancelling means adapted to be carried by the steering wheel of the automobile, whereby said cancelling means can be operated manually from the actuating arm or automatically from the steering wheel.

9. In a self-cancelling automobile directional signal switch adapted to be disposed on the steering gear of an automobile and having cancelling means comprising two parts, one of which is disposed in the switch: that improvement constituting the provision for a second part of the cancelling means of an abutment and a split resilient annular ring for detachable mounting on an automobile steering wheel, said abutment being carried by said ring, said abutment being adjustable relative to said switch upon distortion of said resilient annular ring.

10. In a self-cancelling automobile directional signal switch adapted to be disposed on the steering gear of an automobile, cancelling means comprising two parts, one of which is disposed in the switch: that improvement constituting the provision for a second part of the cancelling means of an abutment and a split annular ring for insertion into a recess in the undersurface of an automobile steering wheel, said abutment being carried by said ring, said ring being of resilient material and having a longer diameter before insertion into the recess than after insertion whereby the friction caused by the resiliency of the ring holds the ring in place.

11. In a self-cancelling automobile directional signal switch adapted to be disposed on the steering gear of an automobile and having cancelling means comprising two parts, one of which is disposed in the switch: that improvement constituting the provision for a second part of the cancelling means of an abutment, a split annular ring for insertion into a recess in the undersurface of an automobile steering wheel, said abutment being carried by said ring, said ring being of resilient material and having a longer diameter before insertion into the recess than after insertion, and a second split annular ring of stiff resilient material for insertion within the first ring and having a longer diameter before insertion than the first ring has after insertion, whereby the friction caused by the resiliency of the rings holds them in place.

12. In a self-cancelling automobile directional signal switch adapted to be disposed on the steering gear of an automobile and having cancelling means comprising two parts, one of which is disposed in the switch: that improvement constituting the provision for a second part of the cancelling means of two spaced abutments, a split annular ring for insertion into a recess in the undersurface of an automobile steering wheel, said abutments being carried by said ring, said ring being of resilient material and having a longer diameter before insertion into the recess than after insertion, the outer surface of said ring being knurled, and a second split annular ring of stiff resilient material for insertion within the first ring and having a longer diameter before insertion than the first ring has after insertion, whereby the friction caused by the resiliency of the rings holds them in place.

13. For use in a self-cancelling automobile directional signal having part of the cancelling means carried by the steering wheel: an actuating switch adapted to be disposed on the steering gear and locked in operative positions, said actuating switch including part of the cancelling means, said actuating switch comprising a housing, a switch mounting plate for said actuating switch, said plate being disposed in said housing, a pivot plate rotatably carried by the mounting plate for said actuating switch, said pivot plate being secured at one end to an actuating arm extending from the end of the actuating switch remote from the steering gear, means defining a radial channel at the other end of the pivot plate, means defining a lateral slot in the mounting plate for said actuating switch, said plate being disposed under the channel, a bushing disposed in the channel, an actuating pin journalled in the bushing and extending below said slot and into an electric switch, return means to bias the pivot plate to inoperative position and means to unlock said actuating switch when in operative position whereby the return means is rendered effective, said part of the cancelling means in the actuating switch being adapted to coact with the part carried by the steering wheel.

14. A combination as set forth in claim 13 wherein the elements of the part of the cancelling means which are disposed in the actuating switch and included in the unlocking means comprise two trigger arms each mounted pivotally at one end thereof to one side of the pivot plate, said trigger arms extending toward the end of the actuating switch adjacent the steering column, two triggers, one trigger being pivotally mounted on the end of one trigger arm adjacent the steering column and the other trigger being similarly mounted on the other trigger arm, guide means adjacent the outer edge of each trigger arm, spring means connecting an end of each trigger to the guide means of the trigger arm on which the trigger is mounted, stop means at an end of each trigger to maintain said triggers in a predetermined position, spring means disposed at the opposite ends of the trigger arms from those at which the triggers are disposed and connecting said ends of the trigger arms, both said spring means biasing the ends of the trigger arms carrying the triggers outwardly, the outer edge of each trigger arm having disposed thereon a detent cooperable with the guide means to lock the trigger arm in position when moved towards the steering gear whereupon the trigger carried by such a trigger arm will extend from the actuating switch.

15. In a self-cancelling automobile directional signal, a trigger arm, means mounting said arm for shiftable movement between two extreme positions, means biasing said arm towards one of said positions, means mounting said arm for movement in a direction transverse to said first-named direction of movement, means biasing said arm in said second-named direction, a trigger, means mounting said trigger on said trigger arm for movement therewith between the two extreme positions, a stationary member adjacent said trigger arm and against which the trigger arm is biased by the second-named biasing means, and a detent on the edge of the trigger arm facing the stationary member, said detent being located on one side of said stationary member when the trigger arm is at one of its positions, and on the other side of said stationary member when the trigger arm is in the other of its positions, said detent cooperating with said stationary member to lock the trigger arm in the extreme position away from the position towards which it is biased by the first-named biasing means.

16. A combination as set forth in claim 15 wherein the edge of the detent in the direction in which the arm is biased by the first-named biasing means is at an angle slightly in excess of 90° to the first-named direction of movement of the trigger arm.

17. A combination as set forth in claim 15 wherein the edge of the detent in the direction in which the arm is biased by the first-named biasing means is at an angle slightly in excess of 90° to the first-named direction of movement of the trigger arm and wherein the opposite edge of the detent is at an angle of considerably less than 90° to said direction of movement.

18. In a self-cancelling automobile directional signal, a pivot member, means rotatably mounting said member, means biasing said member about its mounting means toward a neutral position, a trigger arm, means pivotally mounting said trigger arm on said member, means biasing said arm with regard to said member, a trigger, means pivotally mounting said trigger on said arm, means biasing said trigger with regard to said arm, stop means limiting the movement of said trigger under the influence of said third biasing means, a stationary member adjacent an edge of said trigger arm and against which the trigger arm is biased by the second-named biasing means, and a detent on the edge of the trigger arm facing the stationary member, said detent being located on one side of said stationary member when the pivot member is in neutral position, and on the other side of said stationary member when the pivot member is rotated away from neutral position, said detent cooperating with said stationary member to lock the trigger arm in the position it assumes when the pivot member is rotated away from its neutral position.

19. In a self-cancelling automobile directional signal including an actuating switch adapted to be disposed on the steering gear of an automobile: cancelling means for the switch, said cancelling means comprising an operating abutment carried by a resilient element attachable to the steering gear upon distortion of said element and adjustable upon distortion of said resilient element relatively to the steering gear to predetermine the position of the abutment relatively to the switch.

20. In the combination as set forth in claim 19, the provision of a separately formed means for locking the resilient element in the predetermined position to which it has been adjusted.

21. In the combination as set forth in claim 19, the provision of a separately formed resilient means for locking the first-mentioned resilient means in its adjusted position.

22. A self-cancelling automobile direction signal for vehicles having a steering column on a rotary steering wheel, a casing having electrical circuits therein, a handle pivotally mounted in said casing and movable into either of two opposite positions to close either of two circuits and into an intermediate open-circuit position, arms pivotally mounted at one end of said handle and a trigger pivotally mounted on the other end of each of said arms, one of said arms being placed into a projected position when said handle is moved in one direction from its open circuit position, and the other of said arms being placed into a projected position when said handle is moved in the other direction from its open-circuit position, said triggers being moved by said arms in projected positions in which said triggers engaged said steering column and into retracted positions in which said triggers are in spaced relation to said steering column, and a part on said steering wheel extending into position to engage said triggers when in their projected position to move said trigger and said arms into retracted positions, said arms placing said handle in open-circuit position when moved into retracted position.

References Cited in the file of this patent

UNITED STATES PATENTS

| Number | Name | Date |
| --- | --- | --- |
| 1,668,738 | Smith | May 8, 1928 |
| 2,248,760 | Kirby | July 8, 1941 |
| 2,276,411 | Moore | Mar. 17, 1942 |
| 2,282,709 | Day | May 12, 1942 |
| 2,525,033 | Hollins | Oct. 10, 1950 |